United States Patent
Toyota et al.

(10) Patent No.: US 7,332,875 B2
(45) Date of Patent: Feb. 19, 2008

(54) ILLUMINATION APPARATUS, AND AN ILLUMINATION HEAD AND POWER SOURCE DEVICE USED THEREFORE

(75) Inventors: Makoto Toyota, Saitama (JP); Shin Toyoda, Tochigi (JP); Hitoshi Yoshida, Tochigi (JP)

(73) Assignee: Moritex Corporation, Tokyo (JP)

( * ) Notice: Subject to any disclaimer, the term of this patent is extended or adjusted under 35 U.S.C. 154(b) by 213 days.

(21) Appl. No.: 10/806,178

(22) Filed: Mar. 23, 2004

(65) Prior Publication Data

US 2004/0195983 A1 Oct. 7, 2004

(30) Foreign Application Priority Data

Mar. 28, 2003 (JP) .............................. 2003-092203

(51) Int. Cl.
*H05B 37/02* (2006.01)

(52) U.S. Cl. ..................................................... 315/291
(58) Field of Classification Search ................ 315/150, 315/244, 291, 307, 158, 159
See application file for complete search history.

(56) References Cited

U.S. PATENT DOCUMENTS

| | | | | |
|---|---|---|---|---|
| 5,144,117 A | * | 9/1992 | Hasegawa et al. | ........... 235/455 |
| 6,157,160 A | * | 12/2000 | Okawa et al. | ............... 318/701 |
| 6,485,112 B1 | * | 11/2002 | Haller | ..................... 303/119.2 |
| 6,839,216 B2 | * | 1/2005 | Hagiwara | .................... 361/152 |
| 6,864,641 B2 | * | 3/2005 | Dygert | ........................ 315/216 |
| 6,927,683 B2 | * | 8/2005 | Sugimoto et al. | ........... 340/475 |
| 2001/0020670 A1 | * | 9/2001 | Hyoga | ......................... 250/205 |

FOREIGN PATENT DOCUMENTS

JP           2000-6466           1/2000

OTHER PUBLICATIONS

English Language Abstract of JP 2000-6466.

* cited by examiner

*Primary Examiner*—Shih-Chao Chen
*Assistant Examiner*—Minh Dieu A
(74) *Attorney, Agent, or Firm*—Greenblum & Bernstein, P.L.C.

(57) ABSTRACT

An illumination apparatus used by connecting an illumination head to a power source device, capable of supplying a rated current to individual light emitting devices of the illumination head by using a power source device of an identical rating irrespective of the specification of the illumination head, wherein the illumination head has a current detection resistor for detecting current flowing through the power supply circuit, and the resistance value of the resistor is selected so as to cause a voltage drop equal with a predetermined reference potential when a rated current is supplied to each of the light emitting devices, and the power source device is provided with a current controller for controlling the supplied current such that the potential for the voltage drop caused by the current detection resistor is equal with the reference potential.

9 Claims, 2 Drawing Sheets

ILLUMINATION APPARATUS, AND AN ILLUMINATION HEAD AND POWER SOURCE DEVICE USED THEREFORE

BACKGROUND OF THE INVENTION

1. Field of the Invention

The present invention concerns an illumination apparatus used by connecting an illumination head in which one or more light emitting devices are connected in a power supply circuit to a power source device, as well as an illumination head and a power source device used therefor.

2. Statement of Related Art

In illumination apparatus for lighting up a plurality of LED arranged, for example, in an illumination head, since the lightness is lowered when the current supplied to individual LED as light emitting device is lower than the rated current thereof, and undesired effects are given on the working life when the current is higher, power of the power source is set such that LED can be lit by the supply of the rated current.

For example, as shown in FIG. 3(a), in a case where LED 33, - - - each with a forward rated current of 20 mA are connected by the number of ten in parallel in a power supply circuit 32 of an illumination head 31, a current at 200 mA is supplied to the power supply circuit 32.

Then, the power source device capable of controlling the current supply in accordance with the number of LED to be lit such that a rated current can be supplied to individual LED 33, 33, - - - even when the number of LED 33, 33, - - - to be lit is changed in recent years (refer to JP-A-No. 2000-6466).

However, the power source device of the type described above controls the current depending on the number of LED 33, 33, - - - to be lit in a case of connecting a specified illumination head 31, and can not control the current in accordance with the specification in a case of using a power source device for illumination heads of different specifications.

That is, since the type of the illumination heads using light emitting devices such as LED are versatile and specifications of them such as the connection method of LED to the power supply circuit (for example parallel or series connection), the number of LED and the rating for individual LED are different on every illumination heads, this results in a problem that a power source device or a current controller has to be desired to be designed and manufactured in accordance with the illumination heads.

For example, in a case where the rated current for individual LED attached to the illumination head 31 is normalized as 20 mA, when LED 33, 33, - - - are connected in parallel by the number of ten as described above, it is necessary to supply 200 mA current to the power supply circuit 32. In a case where LED 33, 33, - - - are connected in series by the number of 10, it may suffice to supply 20 mA current to the power supply circuit 34, in a case where LED 33, 33, - - - connected by the number of 10 in series are connected in parallel by three rows, it is necessary to supply 60 mA current to the power supply circuit 35.

Accordingly, while the power source device has been designed in accordance with the specifications for respective illumination heads 31, if a power source device of an identical rating can be used irrespective of the specification of the illumination head 31, this can save the troubles of designing and manufacturing the device on every individual illumination heads 31 to remarkably decrease the manufacturing cost.

In view of the above, it is a technical subject of the present invention to use a power source device of an identical rating irrespective of the specification of the illumination head and which can light up individual light emitting devices of the illumination head connected to the power source device at a rated current.

SUMMARY OF THE INVENTION

The foregoing subject can be solved according to the present invention by an illumination apparatus used by connecting an illumination head in which one or more light emitting devices are connected to a power supply circuit to a power source device, wherein the illumination head has a current detection resistor for detecting current flowing through the power supply circuit, the resistance value of the resistor is selected so as to cause a voltage drop equal with a predetermined reference potential when a rated current is supplied to each of the light emitting devices, and the power source device is provided with a current controller for controlling the supplied current such that the potential for the voltage drop caused in the current detection resistor is equal with the reference potential.

According to the present invention, since the current detection resistor for detecting the current flowing through the power supply circuit is provided to the illumination head, a voltage drop is caused in the current detection resistor by the current supplied from the power source device to the power supply circuit when the illumination head is connected to the power source device.

In this case, since the resistance value for the current detection resistor is selected so as to cause voltage drop equal with a predetermined reference potential when a rated current is supplied to each of the light emitting devices, the potential caused by the voltage drop is lower than the reference potential when the supplied current is smaller than the rated current, whereas the potential caused by the voltage drop is higher than the reference potential when the supplied current is greater than the rated current.

On the other hand, since the power source device has a current controller for controlling the supplied current such that the potential for the voltage drop caused in the current detection resistor is equal with the reference potential, the device monitors the potential for the voltage drop caused in the current detection resistor, and conducts current control so as to increase supplied current when the potential is lower than the reference potential, decrease the supplied current when the potential is higher than the reference potential, and keep the supplied current as it is when the potential is equal with the reference potential.

Thus, a current capable of lighting up the light emitting devices at a rated current can be supplied to the power supply circuit irrespective of the specification of the illumination head.

DESCRIPTION OF ACCOMPANYING DRAWINGS

Figures 3A, 3B, 3C:
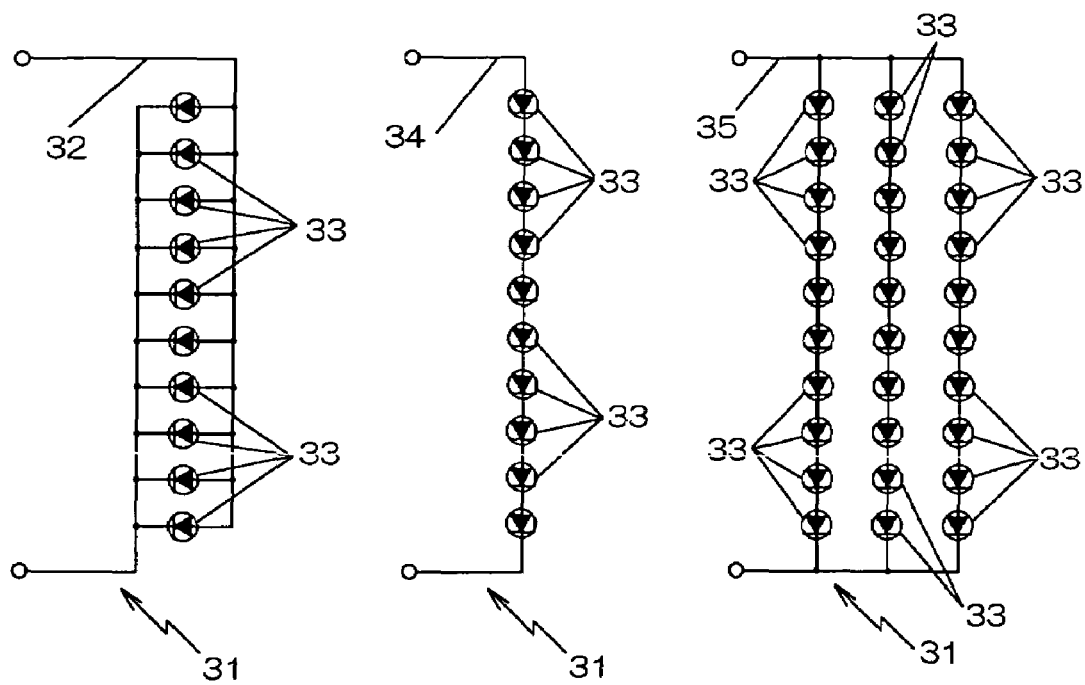

FIGS. 3(a), 3(b), and 3(c) are explanatory views showing an existent illumination head.

DESCRIPTION OF PREFERRED EMBODIMENTS

The present invention is to be described specifically by way of preferred embodiments with reference to the drawings.

Figure 1:
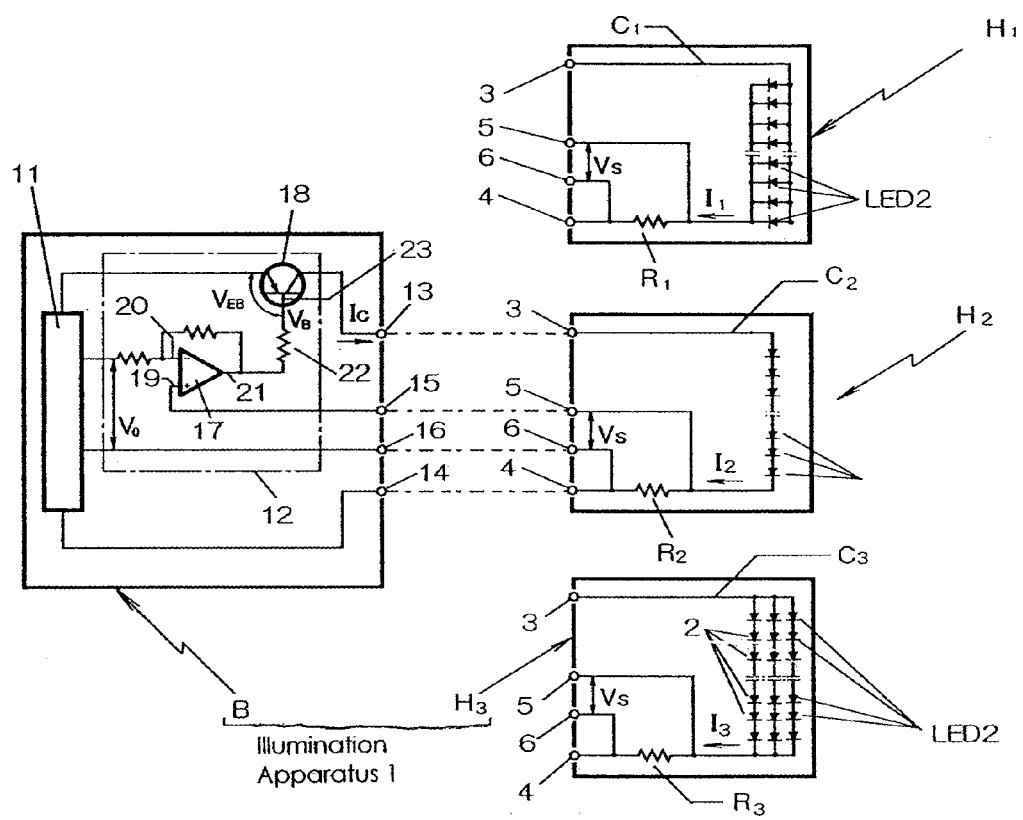
FIG. 1 is an explanatory view showing an illumination apparatus according to the present invention.

An illumination apparatus 1 shown in FIG. 1 is used by connecting illumination heads $H_1$ to $H_3$ to a power source device B in which one or more LED (light emitting device) 2, 2, - - - are connected to each of power supply circuits $C_1$ to $C_3$ for each of the illuminating heads $H_1$ to $H_3$.

LED 2, 2, - - - each at a rated current in the forward direction of 20 mA are connected by the number of 10 in parallel with the power supply circuit $C_1$ in the illumination head $H_1$, identical LED 2, 2, - - - are connected in series in the power supply circuit $C_2$ in the illumination head $H_2$. LED 2, 2, - - - connected serially by the number of 10 are connected in parallel by three rows to the power supply circuit $C_3$ in the illumination head $H_3$.

Further, current detection resisters $R_1$ to $R_3$ for detecting current flowing between a positive side power supply terminal 3 and a ground terminal 4 are connected each in series in each of the power supply circuits $C_1$ to $C_3$. The value for each of the resisters is selected so as to cause a voltage drop equal with a predetermined reference potential $V_0$ when a rated current is supplied to each of LED, 2, 2, - - - .

Then, the potential Vs for the voltage drop caused along each of the current detection resistors $R_1$ to $R_3$ is outputted from output terminals 5 and 6 to the outside.

For example, when a current at 200 mA is supplied to the power supply circuit $C_1$, a rated current flows through each of LED 2, 2, - - - in the illumination head $H_1$. When a current at 20 mA is supplied to the power supply circuit C2, a rated current flows through each of $LED_2$ 2, 2, - - - in the illumination head $H_2$. When a current at 60 mA is supplied to the power supply circuit $C_3$, a rated current flows through each of LED 2, 2, - - - in the illumination head $H_3$.

Then, when the reference potential $V_0$ is set as $V_0$=0.25V irrespective of the number and the specification of the LED 2, 2 - - - , the resistance value for each of the current detection resistors $R_1$ to $R_3$ is: $R_1$=1.25Ω, $R_2$=12.5Ω, and $R_3$=4.17Ω, respectively.

Then, when a rated current is supplied to each of the LED 2, 2, - - - in the power supply circuits $C_1$ to $C_3$, that is, when the current is supplied at 200 mA to the power circuit $C_1$, 20 mA to the power supply circuit $C_2$, and 60 mA to the power supply circuit $C_3$, the voltage drop caused along each of the current detection resistors $R_1$ to $R_3$ is equally 0.25V.

The power source device B comprises a power source unit 11 capable of outputting a voltage sufficient to light up the illumination heads $H_1$ to $H_3$ using LED (for example, at about 12V to 25V), and a current controller 12 for controlling the current supplied to the illumination heads $H_1$ to $H_3$.

Then, the power supply unit 11 is connected by way of a transistor 18 of the current controller 12 at the positive side power supply terminal 13 to the positive side power source terminal 3 for each of the illumination heads $H_1$ to $H_3$, while connected at the ground terminal 14 to the ground terminal 4 for each of the illumination heads $H_1$ to $H_3$.

Further, input terminals 15 and 16 of the current controller are connected with the output terminals 5 and 6 for each of the current detection resistors $R_1$ to $R_3$.

The current controller 12 comprises an operational amplifier 17 with a feedback circuit for comparing the potential Vs caused by the voltage drop across each of the current detection resistors $R_1$ to $R_3$ with the reference potential $V_0$; and the transistor 18 for conducting current control in accordance with the result of comparison.

Then, the input terminal 15 is connected with the forward phase input terminal 19 of the operation amplifier 17, and a reference potential $V_0$ is applied between the other input terminal 16 from the power source unit 11 and the backward phase input terminal 20 of the operational amplifier 17, and the output terminal 21 of the operational amplifier is connected by way of a load resistor 22 to the base 23 of the transistor 18.

With the constitution described above, the potential Vs caused by the voltage drop across each of the current detection resistors $R_1$ to $R_3$ is imputed to the forward phase input terminal 19, and compared with the reference potential $V_0$ by the operational amplifier 17, to output a negative potential when Vs<$V_0$ and output a positive potential when Vs>$V_0$ and is kept to 0 potential when Vs=$V_0$, and the base potential $V_b$ of the transistor 18 changes in accordance with the output potential.

That is, in a case where the current flowing through the power supply circuit $C_1$ to $C_3$ is excessively small, since the potential Vs caused by the voltage drop is lower than the reference potential $V_0$, the base potential $V_B$ is lowered by so much as the negative potential outputted from the operational amplifier 17 to increase the emitter-base potential $V_{EB}$ and, as a result, increase the collector current $I_C$ supplied to the power supply circuits $C_1$ to $C_3$.

Further, in a case where the current supplied through the power supply circuits $C_1$ to $C_3$ is excessively larger, since the potential Vs caused by the voltage drop is higher than the reference potential $V_0$, the base potential $V_B$ is made higher by so much as the positive potential outputted from the operational amplifier 17 to decrease the emitter-base potential $V_{EB}$ and, as a result, the collector current $I_C$ supplied to the power supply circuits $C_1$ to $C_3$ is decreased.

Further, in a case where the current supplied through the power supply circuits $C_1$ to $C_3$ is appropriate, and a rated current is supplied to each of the LED, since the potential Vs caused by the voltage drop is equal with the reference potential $V_0$, 0 potential is outputted from operational amplifier 17 and the base potential $V_B$ does not change. Accordingly, the emitter-base potential $V_{EB}$ does not change as well and, as a result, the current value of the collector current $I_C$ supplied to the power supply circuit $C_1$ to $C_3$ is maintained.

An example of the constitution of the present invention is as has been described above and the operation thereof is to be described.

At first, when the illumination head $H_1$ is connected with the power source device B, in a case where current $I_1$ flowing through the power supply circuit $C_1$ is smaller than 200 mA, since the potential Vs for the voltage drop caused across the current detection detector $R_1$ is lower than 0.25 V, the collector current $I_C$ supplied to the power supply circuit $C_1$ increases. On the other hand, in a case where the current $I_1$ is higher than 200 mA, since Vs is larger than 0.25 V, the collector current $I_C$ decreases. In a case of: $I_1$=200 mA, since Vs=0.25 V, the collector current $I_C$ is maintained at that current value.

Further, when the illumination head $H_2$ is connected with the power source device B, in a case where current $I_2$ flowing through the power supply circuit $C_2$ is smaller than 20 mA, since potential Vs caused across the current detection detector $R_2$ is lower than 0.25 V, the collector current $I_C$ supplied to the power supply circuit $C_2$ increases. On the other hand, in a case where the current $I_2$ is larger than 20 mA, since Vs is higher than 0.25 V, the collector current $I_C$ decreases. In a case of: $I_1$=20 mA, since Vs=0.25 V, the collector current $I_C$ is maintained at that current value.

Further, when the illumination head $H_3$ is connected with the power source device B, in a case where current $I_3$ flowing through the power supply circuit $C_3$ is smaller than 60 mA, since the potential Vs is lower than 0.25 V, the collector current $I_C$ supplied to the power supply circuit $C_3$ increases. On the other hand, in a case where the current 13 is larger than 60 mA, since Vs is higher than 0.25 V, the collector current $I_C$ decreases. In a case of: $I_3$=60 mA, since Vs=0.25V, the collector current $I_C$ is maintained at that current value.

As described above, since each of the current detection resistors $R_1$ to $R_3$ in each of the illumination heads $H_1$ to $H_3$ is selected such that the resistance value causes voltage drop equal with the predetermined reference potential $V_0$ when a rated current is supplied to each of the LED 2, 2, - - -, LED 2, 2, - - - in any of the illumination heads $H_1$ to $H_3$ can be lit with an appropriate current by using an identical power source device D by normalizing and unifying the reference potential $V_0$.

In the foregoing explanations, description has been made to a case where the output terminal 6 for the current detection resistors $R_1$ to $R_3$ and the input terminals 16 of the current controller 12 are disposed separately from the ground terminals 4 and 14, the terminals 6 and 16 may be substituted with the earth terminals 4 and 14.

Figure 2:
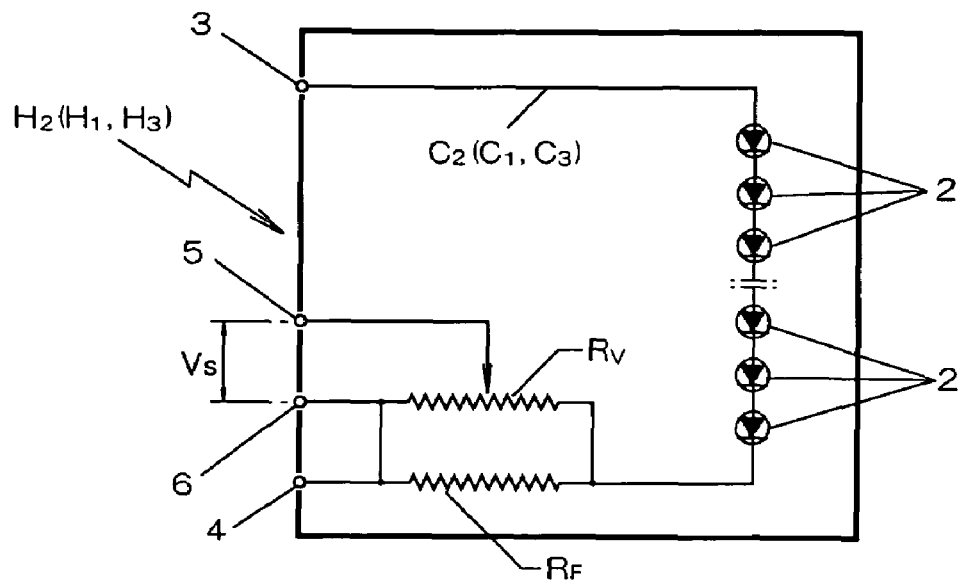
FIG. 2 is an explanatory view showing another embodiment.

Further, the invention is not restricted only to a case where the current detection resistors $R_1$ to $R_3$ is connected in series with each of the power supply circuit $C_1$ to $C_3$ but, as shown in FIG. 2, a fixed resistor $R_F$ and a variable resistor $R_V$ are connected in parallel with each other in each of the power supply circuits $C_1$ to $C_3$ and the potential Vs for the voltage drop caused between the variable terminal 5 and the ground terminal 6 of the variable resistor $R_V$ may be outputted externally, to obtain similar effects.

Further, the number and the rating of LED 2 connected to the illuminating heads $H_1$ to $H_3$, and the method of connection with the power supply circuits $C_1$ to $C_3$, etc. are not limitative but optional, and they can be designed freely. Further, the light amount of LED 2, 2, - - - can be controlled when the potential $V_{20}$ applied between the input terminal 16 and the back phase input terminal 20 from the power supply unit 11 can be controlled to the reference potential $V_0$ or lower.

That is, when the potential $V_{20}$ for the backward phase input terminal 20 is set lower than the reference potential $V_0$, since it is judged as $V=V_{20}$ by the operational amplifier 17 before the current $I_1$ to $I_3$ flowing through the power supply circuit $C_1$ to $C_3$ reaches the rated value, the value of the current flowing through the power supply circuits $C_1$ to $C_3$ is maintained and, as a result, LED 2, 2, - - - are lit at a dark level. Further, when the potential $V_{20}$ for the backward phase input terminal 20 is returned to the reference potential $V_0$, LED 2, 2, - - - are lit at a luminance when the rated current is supplied.

As has been described above according to the present invention, since the current detection resistor is adapted to cause a voltage drop equal with the predetermined reference potential when a rated current is supplied to each of the light emitting devices, it can provide excellent effect capable of lighting up the light emitting devices of the illumination head at a rated current by monitoring the potential and controlling the current, by using a power supply device of an identical specification irrespective of the specification of the illumination head The present disclosure relates to subject matter contained in Japanese Patent Application No. 2003-92203, filed on Mar. 28, 2003, the contents of which are herein expressly incorporated by reference in its entirety.

What is claimed is:

1. An illumination apparatus, comprising:
   a power source device, configured to supply a rated current to a plurality of different illumination heads having different rated currents, comprising a current controller and an input terminal, and
   an illumination head, connected to the power source device, and comprising a current detection resistor that detects a current flowing through a power supply circuit, at least one light emitting device connected to the power supply circuit in the illumination head, and an output terminal which connects to the input terminal of the power source device and outputs a voltage drop across the current detection resistor,
   wherein a resistance value of the current detection resistor generates a voltage drop equal to a predetermined reference potential when a rated current is supplied to each light emitting device, and
   the current controller controls the supplied current such that the voltage drop generated across the current detection resistor is equal to the predetermined reference potential.

2. An illumination apparatus as recited in claim 1, wherein the supplied current is controlled to be a rated current of the illumination head when the illumination head is connected to the power source device.

3. An illumination apparatus as recited in claim 1, wherein a constant voltage is output from the current detection resistor for each of a plurality of illumination heads with different rated currents.

4. An illumination head, comprising:
   at least one light emitting device connected to a power supply circuit;
   a current detection resistor that detects a current flowing in the power supply circuit, a resistance value of the current detection resistor generating a voltage drop equal to a predetermined reference potential when a rated current is supplied to each light emitting device; and
   an output terminal that outputs a voltage drop across the current detection resistor,
   wherein the illumination head is connectable to a power source device configured to supply a rated current to a plurality of different illumination heads having different rated currents.

5. An illumination head as recited in claim 4, wherein the supplied current is controlled to be a rated current of the illumination head when the illumination head is connected to the power source device.

6. An illumination head as recited in claim 4, wherein a constant voltage is output from the current detection resistor for each of a plurality of illumination heads with different rated currents.

7. A power source device that supplies power to an illumination head, comprising:
   a current controller; and
   an input terminal,
   wherein the illumination head includes a current detection resistor that detects a current flowing to a power supply circuit in which at least one light emitting device is connected and an output terminal that outputs a voltage drop across the current detection resistor, a resistance value of the current detection resistor generating a voltage drop equal to a predetermined reference potential when a rated current is supplied to each light emitting device, the input terminal connects to the output terminal, the current controller is disposed such that the voltage drop generated across the current detection resistor is equal to the predetermined reference potential when the illuminating head is connected to the power source device, and the power source device is configured to supply a rated current to a plurality of different illumination heads having different rated currents.

8. A power source device as recited in claim 7, wherein the supplied current is controlled to be a rated current of the illumination head when the illumination head is connected to the power source device.

9. A power source device as recited in claim 7, wherein a constant voltage is output from the current detection resistor for each of a plurality of illumination heads with different rated currents.

* * * * *